US006706853B1

(12) United States Patent
Stanssens et al.

(10) Patent No.: US 6,706,853 B1
(45) Date of Patent: Mar. 16, 2004

(54) COMPOUND FOR USE AS A MINERAL FIBRE BINDER AND PROCESS FOR PROVIDING SUCH

(75) Inventors: Dirk Armand Wim Stanssens, Houthalen (BE); Thor Husemoen, Roskilde (DK); Erling Lennart Hansen, Gentofte (DK)

(73) Assignee: Rockwool International A/S (DK)

( * ) Notice: Subject to any disclaimer, the term of this patent is extended or adjusted under 35 U.S.C. 154(b) by 0 days.

(21) Appl. No.: 09/600,367

(22) PCT Filed: Jan. 15, 1999

(86) PCT No.: PCT/NL99/00029

§ 371 (c)(1),
(2), (4) Date: Sep. 27, 2000

(87) PCT Pub. No.: WO99/36368

PCT Pub. Date: Jul. 22, 1999

(30) Foreign Application Priority Data

Jan. 16, 1998 (NL) .............................................. 1008041

(51) Int. Cl.[7] .............................................. C08G 69/26
(52) U.S. Cl. .................... 528/350; 528/332; 528/353; 428/221; 428/357; 428/361; 524/81; 524/401
(58) Field of Search ................................ 528/332, 350, 528/353; 428/221, 357, 361, 81; 524/401

(56) References Cited

U.S. PATENT DOCUMENTS

| 4,076,917 A | * | 2/1978 | Swift et al. .............. 525/329.5 |
|---|---|---|---|
| 4,115,637 A | | 9/1978 | Cenci et al. ................. 526/562 |
| 4,560,768 A | | 12/1985 | Hefner, Jr. et al. .......... 548/435 |
| 4,710,406 A | | 12/1987 | Fugier et al. ............. 427/389.8 |
| 5,143,582 A | | 9/1992 | Arkens et al. ............... 162/135 |
| 5,340,868 A | | 8/1994 | Strauss et al. .............. 524/461 |
| 5,523,152 A | | 6/1996 | Thurber et al. ............. 428/323 |
| 6,037,284 A | | 3/2000 | Holstein et al. ............... 501/35 |
| 6,060,414 A | | 5/2000 | Holstein et al. ............... 501/36 |
| 6,071,994 A | * | 6/2000 | Hummerich et al. ......... 524/247 |
| 6,387,496 B1 | * | 5/2002 | Van Benthem et al. ..... 428/402 |
| 6,392,006 B1 | * | 5/2002 | Van Benthem et al. ..... 428/402 |

FOREIGN PATENT DOCUMENTS

| EP | 516375 A2 | 12/1992 |
| EP | 596088 B1 | 8/1997 |
| EP | 791087 B1 | 8/1998 |
| WO | 9206047 | 4/1992 |

OTHER PUBLICATIONS

Patent Abstract No. XP–002101047; G. M. Dulitskaya et al.; Solvent–free thermo–reactive lacquer—contg. unsatd. oligo–ester–imide(s), for impregnating electrical windings binders for plastics; Oct. 22, 1980; 1 p.
European Patent Office—Patent Abstracts of Japan; Mikuni Hiroyuki; Polymerizable Imide Compound and Photocurable Composition; Nov. 14, 1995; 1 p.

* cited by examiner

*Primary Examiner*—Samuel A. Acquah
(74) *Attorney, Agent, or Firm*—Webb Ziesenheim Logsdon Orkin & Hanson, P.C.

(57) ABSTRACT

Compound or salts thereof suitable for use as a binder for mineral fibers, for example glass or stone wool, said compound containing a carboxylic acid group and/or a β-hydroxyalkyl amide group.

44 Claims, 3 Drawing Sheets

COMPOUND FOR USE AS A MINERAL FIBRE BINDER AND PROCESS FOR PROVIDING SUCH

Figure 1:
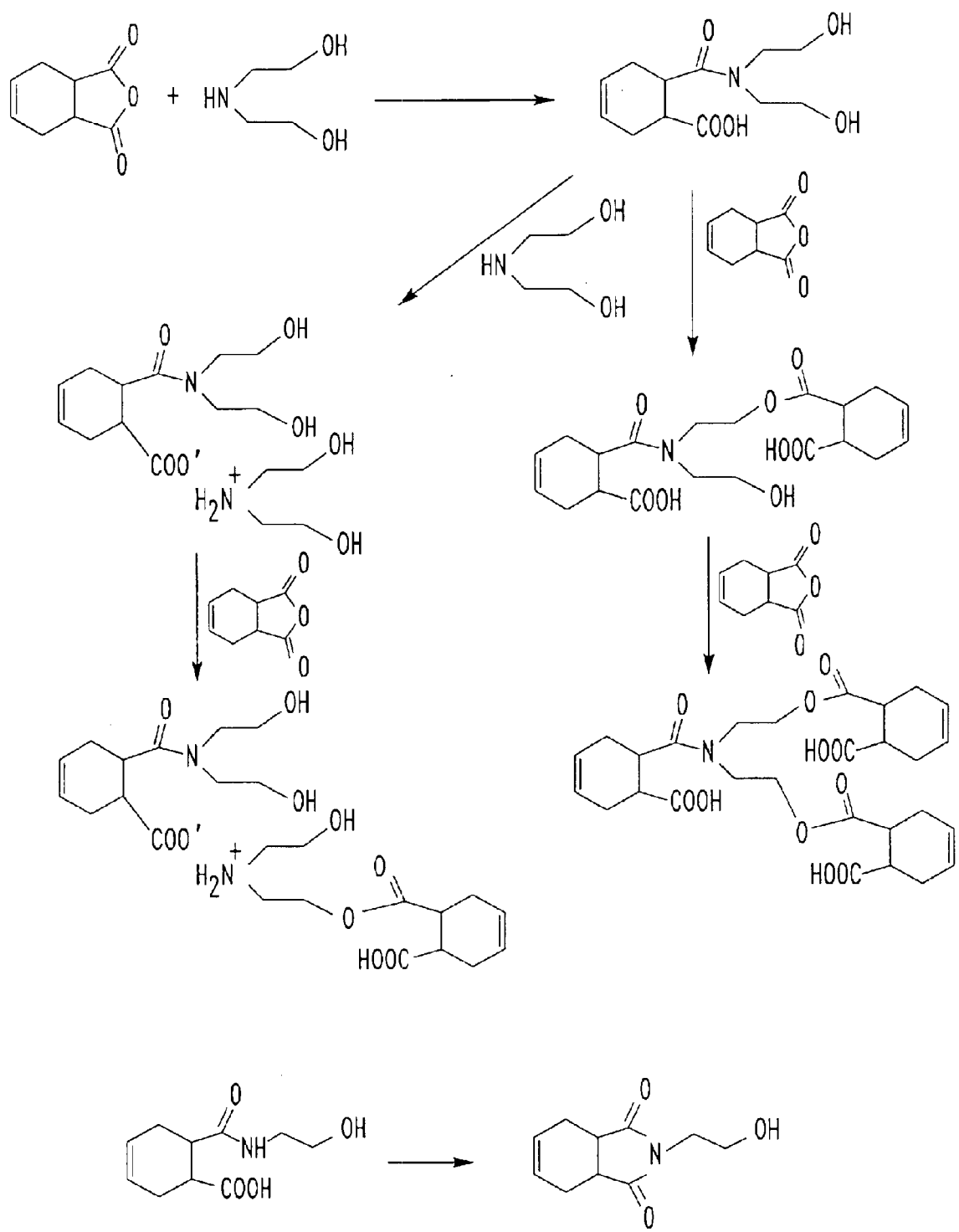

The invention relates to a compound or salts thereof suitable for use as a binder for mineral fibres, i.e. man made vitreous fibres (MMVF), for example glass slag or stone wool, i.e mineral wool, in particular stone wool, a binder composition comprising such a compound, a process for providing said compound and composition, a mineral fibre product provided with such a binder and the use of said compound and composition as a mineral fibre binder.

Phenol and formaldehyde resins which are mainly used as binders for glass or stone wool are toxic.

During application and curing of the benders, after provision thereof to the mineral fibres, phenol, formaldehyde and ammonia are released. From an environmental point of view this is undesirable.

Furthermore during application, mostly by spraying, of the binder onto the spun glass or stone fibres a large amount of binder is lost, which is almost impossible to recover for re-use.

According to a first aspect of the present invention there is provided a compound according to the claims 1–12.

The inventors have found that such a compound is particularly suitable for use as a binder for mineral wool products, whereby since the compound is preferably non-polymeric and has a low molecular weight, costs are minimized with respect to polymeric binders, and the handling of such non-polymeric compounds is straightforward.

Since the compound is soluble in water no further solublizing agents are required in order to provide a soluble binder having a desired viscocity for adhering to the mineral fibres.

Moreover on applying or curing the compound according to the present invention, no toxic materials are released into the environment.

The compounds according to the present invention also have desirable properties with respect to hardness, scratch resistance, chemical resistance, mechanical properties and adhesive properties once cured.

In formula (I) the R-groups, with the exception of $R_9$ can form either together or with the adjacent carbon atoms, or with the carbon atoms on B or Y a cyclo aliphatic group.

Preferably, B is a 1,2-ethylene, 1,2-ethylidene, 1,3-propylene, 1,2-cyclohexyl, 1,2-phenylene, 4-carboxyl-1,2-phenylene, 1,3-phenylene, 1,4-phenylene and/or 1,2 cyclohex-4-enyl radical.

B can be saturated or unsaturated.

B can be substituted with for instance a ($C_1$–$C_{12}$) alkyl group which is saturated or unsaturated.

B can form a part of a polymer. Such polymers can be obtained by the reaction of anhydride function polymers with a β-hydroxy alkylamine or a derivative thereof.

Anhydride functional polymers can for instance be obtained by a radical polymerisation of Maleic anhydride with styrene and with (meth)acrylate monomers.

Maleic anhydride can also be grafted onto unsaturated compounds. A reaction between maleic anhydride and oils, such as for instance linseed oil, results in products, which are called maleinised oils, which may be grafted onto unsaturated compounds, used as a comonomer or mixed into the compounds.

If B does not form part of a polymer, the molecular weight of the compounds, is less than 1000 and preferably less than 600.

According to a second aspect of the present invention, there is provided a curable composition suitable for use as a binder for mineral fibers, according to claims 13–17.

Such a composition exhibits the properties as described above for the compound.

The composition may contain more than 10 wt %, for example more than 25 wt %, and preferably 50 wt % or more of the compound according to claims 1–12.

Standard binding additives can improve the binder, examples of such additives include: aminotropyl siloxane to improve the adhesion on glass, stabilizers to prevent thermal or UV degradation and surface-active compounds. Fillers, such as clay, silicates, magnesium sulfate and pigments, such as titanium oxide, can also be applied, as well as hydrophobising agents such as fluorine compounds, oils, minerals and silicone oil (reactive or ion reactive).

The composition may also be applied in combination with other binder compositions such as for instance phenol-formaldehyde resins.

A very good binding strength is achieved when an accelerator is added to the composition, a preferred accelerator being sodium hypophosphite.

Furthermore since the binder composition is preferably composed of low molecular weight compounds, it has a viscosity at high concentrations which is lower than polyacrylic binders for example.

This is advantageous since on curing, following an initial flash evaporation, any water present usually evaporates. Before curing the composition still has a viscosity which allows it to be sprayed onto the mineral fibres and adhere thereto once sprayed.

Since the composition is intrinsically water soluble, no solublizing agents need to be provided thereto in order to enable application of the composition to the mineral fibers, the viscosity of the composition being high enough to adhere well to the mineral fibers and low enough, as stated above to enable sprayability. A decrease in the viscosity can be achieved by heating the composition to a temperature below which an eventual condensation reaction takes place.

According to a third aspect of the present invention there is provided a compound according to claim 18.

Figure 7:
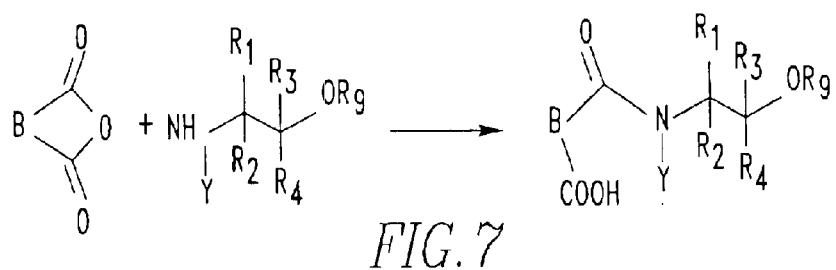

According to a fourth aspect of the present invention there is provided a process for providing a compound suitable for use as a binder for mineral fibers according to the claims 19–28, see FIG. 7.

For a schematic illustration of the reaction, for example, between tetrahydro pthalic anhydride and diethanolamine see FIG. 1.

The reaction between the anhydride and the alkanolamine can proceed without a solvent, in water or in an organic solvent. Preferably, the reaction starts in the presence of <40 weight % of water compared to the reactants.

The distillation of the water can, if desired, proceed at 1 bar, under vacuum or azeotropically.

The equivalent ratio anhydride: alkanolamine lies generally between 1, 8:1, 0 and 1, 0:1, 8. Preferably, this ratio lies between 1, 5:1, 0 and 1:1, 5.

In case a high crosslink density is desired, di- or trialkanolamines or carboxylic acid functional anhydrides can be applied as starting materials.

Another aspect of the present invention relates to the compound obtainable via this process.

The reaction of diethanolamine with an activated ester, such as a cyclic anhydride, can also result in an ester amine. However, the same product can also be formed out of the β-hydroxyalkylamide because of an internal rearrangement. The inventors have measured that the β-hydroxyalkylamide and the ester-amine form an equilibrium with each other usually in a 85/15 ratio. In case the ester-amine reacts further with a cyclic anhydride another β-hydroxyalkylamide is formed, see FIG. 2, for example.

The applied compound can also be obtained by the reaction between an alkanolamine, such as for instance described above and a compound having one carboxylic acid group and a activated carboxylic acid group.

The compound having a carboxylic acid group and an activated carboxylic acid group is preferably a compound according to the following formula:

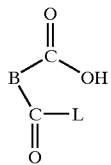

In which
B has the meaning as referred to in claims 5 and 7.
L=

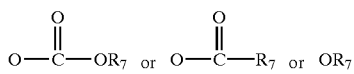

In which $R^7$ is a $(C_1-C_{12})$ branched or linear alkyl group.

Examples of appropriate compounds with one carboxylic acid group and one activated carboxylic acid groups are alkyl esters, such as for instance mono (m) ethyladipate and mono (m) ethylsebacate. Activated carboxylic acid groups are for instance anhydrides and thioesters.

The compound applied in the invention can also be obtained by reaction between a cyclic anhydride, such as described above, and an alcohol after which the obtained reaction product in situ reacts with an alkanolamine.

Examples of appropriate alcohols are $(C_1-C_{10})$ alcohols. Preferably methanol or ethanol are applied.

Another binder composition according to the invention can be obtained by reacting linear polyanhydrides with alkanolamines or derivatives.

It is also possible that the carboxylic acid groups and the β-hydroxy alkylamide groups are not located on the same compound.

Figure 4:
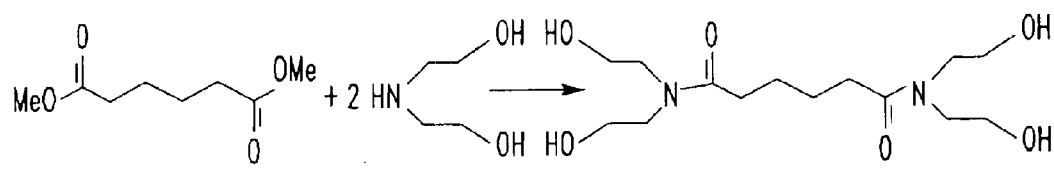
Figure 5:
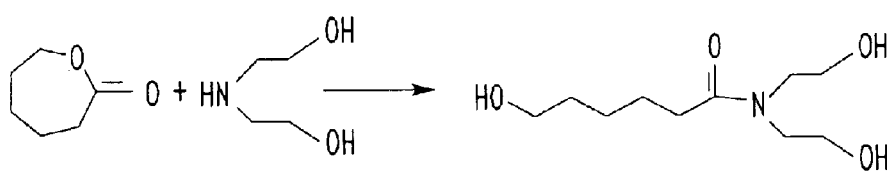

According to a further aspect of the present invention, there is provided a composition suitable for use as a binder, said composition containing one or more compounds with carboxylic acid groups or β-hydroxyalkylamide groups. Suitable water soluble molecules having β-hydroxyalkylamides can be obtained as shown in FIGS. 4 and 5 wherein the starting materials are dimethyl adipate and caprolactone respectively. Because no salt formation is possible with these molecules, it is known that predominantly (>70%) the amides are formed.

This reaction can proceed in the presence of a catalyst such as for instance sodium methanolate. If no catalyst is used, the reaction should be performed at a higher temperature.

The carboxylic acid containing compounds are fully or partially water soluble compounds, such as maleic acid, glutaric acid, adipic acid, 2-methyl adipic, succinic acid, citric acid and tartaric acid.

The carboxylic acid groups containing compounds can also be obtained by partial or full reaction of high functional alcohols, mono di and polysaccharides, such as sucrose or polyvinylalcohol, with cyclic anhydrides as described above.

Water soluble compounds are compounds which can be homogeneously divided in water. Eventually, emulsions or dispersions can be applied.

To further improve the water solubility of the carboxylic acid functional compounds, a base can be added, for example, a base is added which evaporates during the curing reaction. Examples of such bases are amines such as ammonia, methylamine, diethylamine and triethylamine.

Figure 6:
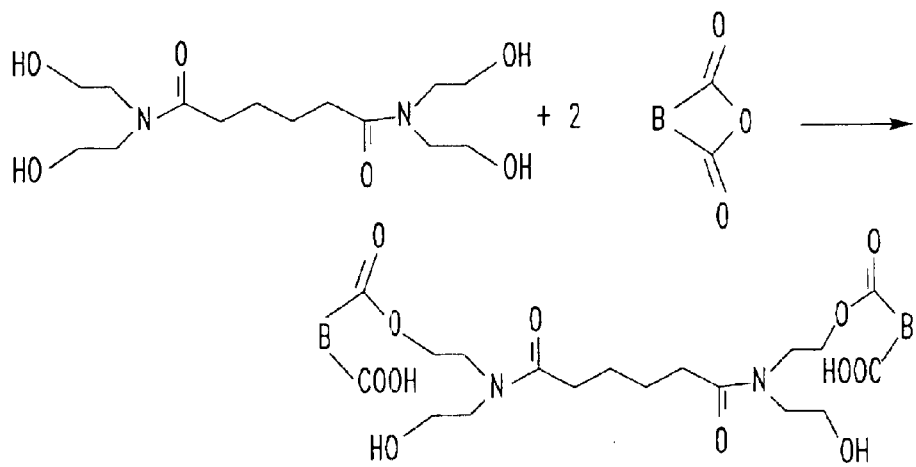

In another preferred form of the invention addition products having β-hydroxyalkylamides with cyclic anhydrides are used. FIG. 6 shows one of the resultant reaction products.

According to another aspect of the present invention there is provided a cureable binder according to claims 30–33.

According to another aspect of the present invention there is provided a process for providing a bound mineral fibre product according to claims 34 and 35. The binder composition is preferably sprayed onto the fibres just after the spinning of the glass or the stonemelt. The curing of the binder composition proceeds by bringing the sprayed fibres into an oven. The curing time is mainly dependent on the components used in the binder and on the desired oven temperature. β-hydroxy alkylamide groups attached to an aromatic group, for instance, will react slower with carboxylic acids than the ones attached on an aliphatic group and aromatic carboxylic acids will react faster with β-hydroxy alkylamides than aliphatic carboxylic acid groups. The curing temperatures lie mostly between 150° C. and 400° C. and preferably between 200° C. and 400° C. The curing times lie mostly between 10 sec and 600 sec.

Unused binder, can, due to its low reactivity, be recycled. If water of the binder composition is evaporated during this process, water may be returned to the process to return the viscosity to the desired level, if needed.

When spraying binder composition to the fibers does not end in the wool but is collected in process water either directly or when clearing walls and ducts in the spinning chamber system. This water may be used as dilution water for the binder, where by loss of binder is avoided/reduced.

The raw materials for fibres composition can be converted to a melt in the conventional manner, for instance in a gas heated furnace or in an electric furnace or in a shaft or cupola furnace. The melt can be converted to fibres in the conventional manner, for instance by a spinning cup process or by cascade rotor process, for instance described in WO 92/06047.

Man made vitreous fibres (MMVF) are made from vitreous melt, such as of stone, slag, glass or other melts. The melt is formed by melting in a furnace a mineral composition having the desired analysis. This composition is generally formed by blending rocks or mineral to give the desired analysis. The binder can be used on MMVF which are durable in use but which have been shown to be biologically soluble e.g. as described in EP 791 087 and EP 596 088.

The fibres can have any convenient fibre diameter and length. Generally the average fibre diameter is below 10 μm e.g. 5 μm. Usually a mineral wool product contains 1–15 wt. % binder, preferably 2–10 wt. %. Usually the binder is added to the fibres just after fibersation of the melt. Generally the mineral wool product is in form of a slab, sheet or other shaped articles. Products according to the invention may be formulated for any of the convential purposes of MMV fibres, for instance slabs, sheets, pipes or other shaped products that are to serve as thermal insulation, fire insulation and protection or noise reduction and regulation or as horticultural growing media. The binder can also be used to coat the surface of either the fibres or one or more of the surfaces of the mineral wool product. Silane and mineral oil are typical additives for mineral wool products. A typical phenolic binder is described in U.S. Pat. No. 4,710,406.

According to yet another aspect of the present invention there is provided the use of the compounds and/or compositions of the present-invention as binding agents for mineral fibre products.

Figure 2:
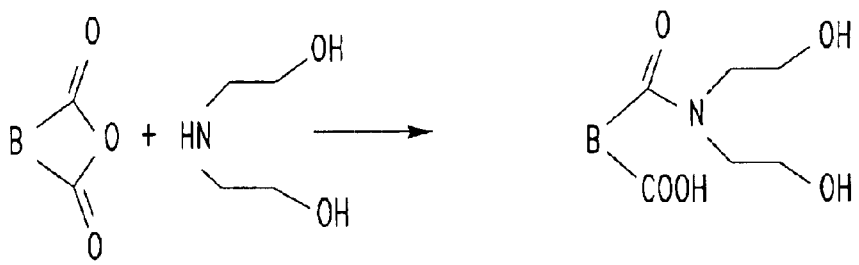
Figure 3:
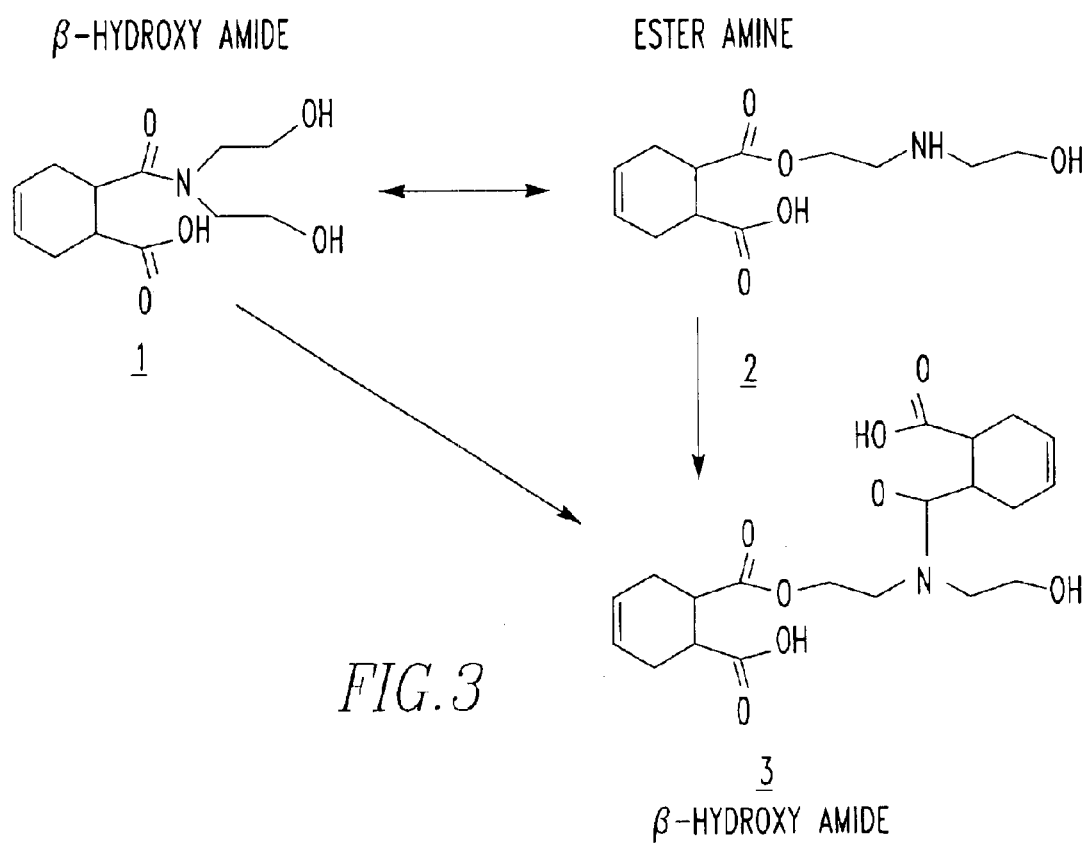

The invention will now be described by way of the following examples 1–12, tables 1, 2 and 3 and FIGS. 1–7, wherein;

FIGS. 1, 2 and 7 show schematically a reaction process for providing compounds according to the present invention, FIG. 3 shows the equilibrium between a β-hydroxy amide and ester amine and their conversion into a further β-hydroxy amide, and FIGS. 4 and 5 show respectively the reaction between dimethyl adipate and caprolactone with diethanolamine in order to provide compounds according to the present invention, FIG. 6 shows mixtures of different compounds according to the present invention obtained by reacting functional β-hydroxyalkyl amides partially with cyclic anhydrides.

EXAMPLE 1

Preparation of the Condensation Product of Phthalic Anhydride with Diethanolamine In a double jacketed glass reactor, heated with mineral oil, provided with a mechanical stirrer and a nitrogen inlet, 300 g phthalic anhydride, 100 g water and 212 g diethanolamine were brought. The reaction mixture was steadily heated whilst stirring to ca. 70° C. After two hours the phthalic anhydride was completely dissolved and the reaction was a clear, colorless, low viscous solution.

EXAMPLE 2

Preparation of the Condensation Product of Succinic Anhydride with Diethanolamine In a double jacketed glass reactor, heated with mineral oil, provided with a mechanical stirrer and a nitrogen inlet, 300 g succinic anhydride. 100 g water and 315 g diethanolamine were. The reaction mixture was steadily heated whilst stirring to ca. 70° C. After two hours the succinic anhydride was completely dissolved and the reaction product was ready. The reaction product was a clear, colorless, low viscous solution.

Investigation into the Compound Obtained in Examples 1 and 2

The compounds obtained according to examples 1 and 2 were cured on a glass plate in an oven during 60 sec at 250° C.

The cured compounds had very good properties with respect to hardness, scratch resistance, chemical resistance, mechanical properties and adhesion to glass.

EXAMPLE 3

Preparation of the Condensation Product of 1.2.3.6-tetrahydrophthalic Anhydride with Diethanolamine In a double jacketed glass reactor, heated with hot water, provided with a magnetic stirrer and a nitrogen inlet, 120 g 1.2.3.6-tetrahydrophthalic anhydride, 40 g water and 84.8 g diethanolamine were brought. The reaction mixture was steadily heated, whilst stirring, to 70° C. After 2 hours the anhydride was completely dissolved and the reaction product was ready. The reaction product was a clear, slightly yellow, low viscous solution, easily dilutable with water.

EXAMPLE 4

Preparation of the Condensation Product of 1.2.3.6-tetrahydrophthalic Anhydride with Diethanolamine In a double jacketed glass reactor, heated with hot water, provided with a magnetic stirrer and a nitrogen inlet, 170 g 1.2.3.6-tetrahydrophthalic anhydride, 120 g water and 84.8 g diethanolamine were brought. The reaction mixture was steadily heated, whilst stirring, to 70° C. After 2 hours the anhydride was completely dissolved and the reaction product was ready. The reaction product was a clear, slightly yellow, low viscous solution, easily dilutable with water.

EXAMPLE 5

Preparation of the Condensation Product of 1.2.3.6-tetrahydrophthalic Anhydride with Diethanolamine In a double jacketed glass reactor, heated with hot water, provided with a magnetic stirrer and a nitrogen inlet, 244 g 1.2.3.6-tetrahydrophthalic anhydride, 120 g water and 84.8 g diethanolamine were brought. The reaction mixture was steadily heated whilst stirring to 70° C. After 2 hours the anhydride was completely dissolved and the reaction product was ready. The reaction product was a clear, slightly yellow, and exhibited a low dilutability with water.

EXAMPLE 6

Preparation of the Condensation Product of 1.2.3.6-tetrahydrophthalic Anhydride with Diethanolamine In a double jacketed glass reactor, heated with hot water, provided with a magnetic stirrer, 40 g water, 84.8 g diethanolamine and 20 g 1.2.3.6-tetrahydrophthalic anhydride were brought. The reaction mixture was steadily heated while stirring to 90° C. As soon as the anhydride dissolved another 20 g anhydride was added, followed with another 20 g again until dissolved and further until totally 120 g 1.2.3.6-tetrahydrophthalic anhydride was added. 15 minutes after the anhydride was completely dissolved the reaction product was ready. The reaction product was clear, slightly yellow, low viscous and easily dilutable with water.

EXAMPLE 7

Preparation of the Condensation Product of Succinic Anhydride with Diethanolamine In a double jacketed glass reactor, heated with water and provided with a magnetic stirrer; 120 g of succinic anhydride, 80 g water and 126 g diethanolamine were brought. The reaction mixture was steadily heated while stirring to 90° C. After two hours, the succinic anhydride was completely dissolved and the reaction product was ready. The reaction product was a clear, colourless, low viscous solution, easily dilutable with water. Diluted with water to 41% solid content, the viscosity was 6.3 cPs. Binder analysis has given that 46.6% of the amine was bound as amide and 10.9% of the hydroxy groups were bound as ester.

EXAMPLE 8

Preparation and Testing of Selected Binder Samples to Evaluate the Binding Strength Towards Shots with Mineral Fibre Composition (Grit Bar Test)

Shots with size between 0.25 and 0.5 mm diameter were used to make bars with dimensions 140 mm×25 mm×10 mm.

For making the bars 90 ml binder solution with 15% solids content and 0.2% silane coupling agent of binder solids were mixed with 450 g shots.

The coupling agent was gamma-aminopropyltriethoxysilane.

To some of the binder solutions were added $NaH_2PO_2$—$H_2O$ (3% of binder solids) as curing accelerator.

Out of the 450 g shots mixed with birder solution can be made 8 bars which is cured 2 hours at 200° C. in an incubator.

Four of the bars were broken directly (dry strength), the other 4 are placed 3 hours in 80° C. water before they are broken (wet strength).

The binding strength was determined by breaking the bars in a measuring device, where the clamping length is 100 mm and the velocity of the compressing beam was 10 mm/min. Using the clamping length, width and thickness of the bars, the bending strength was determined in $N/mm^2$.

TABLE 1

Results obtained by Grit Bar Test

| | Binding strength dry | Binding strength (wet) 80° C. water | |
|---|---|---|---|
| Binder example 1 | No strength | | DEA:PTA 1:1 |
| Binder example 2 | 11 $N/mm^2$ | 1 $N/mm^2$ | DEA:SCA 1:1 |
| Binder example 3 | 7 $N/mm^2$ | 3 $N/mm^2$ | DEA:THPA 1:1 |
| Binder example 3 + accelerator | 9 $N/mm^2$ | 2 $N/mm^2$ | DEA:THPA 1:1 |
| Binder example 4 | 6 $N/mm^2$ | 2 $N/mm^2$ | DEA:THPA 1:1.4 |
| Binder example 4 + accelerator | 10 $N/mm^2$ | 4 $N/mm^2$ | DEA:THPA 1:1.4 |
| Binder example 6 | 4 $N/mm^2$ | 2 $N/mm^2$ | DEA:THPA 1:1 |
| Binder example 6 + accelerator | 8 $N/mm^2$ | 3 $N/mm^2$ | DEA:THPA 1:1 |
| Binder example 7 + accelerator | 11 $N/mm^2$ | | DEA:SCA 1:1 |
| Standard phenolic binder | 5–6 $N/mm^2$ | 3–4 $N/mm^2$ | |

DEA = diethanolamine, SCA = succinic anhydride, THPA = 1.2.3.6 tetrahydrophthalic anhydride, PTA = phthalic anhydride.

EXAMPLE 9

Preparation and Testing of a Mineral Fibre Product

Based on the results of the binding strength in example 8, a production trial on a standard stonewool line was performed. The binder used was as described in example 6.

It was produced a standard product with density 100 $kg/m^3$, 100 mm thickness and ignition loss about 2.5%.

The mechanical strengths were measured according to EN 826 (compression strength) and EN 1607 (delamination strength).

TABLE 2

Results (mean values of 8 samples)

| Binder | Binder content | Oil content | Density | 10% comp. strength | De-lamination strength |
|---|---|---|---|---|---|
| DEA/THPA | 2.56% | 0.19% | 98.8 $kg/m^3$ | 26.2 KPa | 7.1 KPa |
| DEA/THPA + accelerator | 2.61% | 0.19% | 101 $kg/m^3$ | 29.3 KPa | 9.6 KPa |
| Reference Phenolic binder | 2.5% | 0.2% | 100 $kg/m^3$ | 25 KPa | 7 KPa |

EXAMPLE 10

Preparation of the Condensation Product of 1.2.3.6-tetrahydrophthalic Anhydride with Diethanolamine In a double jacket glass reactor, heated with hot water, provided with a magnetic stirrer, 42 g water, 84.68 diethanolamine and 20 g 1.2.3.6-tetrahydrophthalic anhydride were brought. The reaction mixture was steadily heated whilst stirring to 90° C. As soon as the anhydride dissolved another 20 g anhydride was added, followed with another 20 g again until dissolved, and further until totally 160 g anhydride was added. 15 minutes after the anhydride was completely dissolved the reaction product was ready. The reaction product was clear, slightly yellow, low viscous and easily dilutable with water.

The viscosity of the binder solution was measured at different solids content in water at 25° C.

| | |
|---|---|
| 91.8% solids | 400000 cPs |
| 78.8% solids | 3500 cPs |
| 57.4% solids | 56 cPs |
| 10.0% solids | 1.2 cPs |

Binder analysis showed that 16.8% of the amine groups are bound as amide and 37.8% of the hydroxy groups were bound as ester.

EXAMPLE 11

Preparation of the Condensation Product of 1.2.3.6-tetrahydrophthalic Anhydride and Phthalic Anhydride with Diethanolamine In a double jacket glass reactor, heated with hot water, provided with a magnetic stirrer, 42 g water, 84.8 g diethanolamine and 20 g 1.2.3.6-tetrahydrophthalic anhydride were brought. The reaction mixture was steadily heated whilst stirring to 90° C. As soon as the anhydride dissolved 20 g phthalic anhydride was added. When dissolved another 20 g 1.2.3.6-tetrahydrophthalic anhydride was added and further until totally 120 g 1.2.3.6-tetrahydrophthalic anhydride was added. 15 minutes after the anhydride was completely dissolved the reaction product is ready. The reaction product was clear, slightly yellow, low viscous and easily dilutable with water.

EXAMPLE 12

Preparation of the Condensation Product of 1.2.3.6-tetrahydrophthalic Anhydride with Triethanolamine In a double jacket glass reactor, heated with hot water, provided with a magnetic stirrer, 42 g water, 120 g triethanolamine and 20 g 1.2.3.6-tetrahydrophthalic anhydride were brought. The reaction mixture was steadily heated whilst stirring to 90° C. As soon as the anhydride was dissolved another 20 g phthalic anhydride was added, followed with another 20 g again until dissolved, and further until totally 120 anhydride is added. 15 minutes after the anhydride was completely dissolved the reaction product was ready. The reaction product was clear, slightly yellowish brown, low viscous and easily dilutable with water.

TABLE 3

| | Binding strength dry | Binding strength wet | |
|---|---|---|---|
| Binder example 4 (cured at 250° C.) | 4 $N/mm^2$ | 1 $N/mm^2$ | DEA:THPA 1:1.4 |
| Binder example 3 (cured at 250° C.) | 7 $N/mm^2$ | 3 $N/mm^2$ | DEA:THPA 1:1 |

TABLE 3-continued

| | Binding strength dry | Binding strength wet | |
|---|---|---|---|
| Binder example 11 | 4 N/mm² | 4 N/mm² | DEA:THPA:PTA 1:1:0.15 |
| Binder example 11 + accelerator | 9 N/mm² | 5 N/mm² | DEA:THPA:PTA 1:1:0.15 |
| Binder example 12 | 4 N/mm² | 2 N/mm² | TEA:THPA 1:1 |
| Binder example 12 + accelerator | 9 N/mm² | 3 N/mm² | TEA:THPA 1:1 |

TEA = Triethanolamine

The invention is not limited to the above description and examples; the requested rights are rather determined by the following claims.

What is claimed is:

1. A process for preparing a water-soluble resin for use as a mineral wool binder, said process comprising the step of mixing together under reactive conditions, a cyclic anhydride and an alkanolamine to form a range of reaction products forming the components of the binder resin.

2. The process according to claim 1, wherein the alkanolamine is a secondary β-hydroxy alkylamine.

3. The process according to claim 1, wherein the mixture is heated to a temperature lying in the range between about 20 and about 100° C.

4. The process according to claim 1, wherein the cyclic anhydride has the following general formula (II),

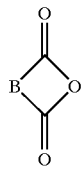

(II)

wherein B is a group selected from the group consisting of a $C_2$–$C_{20}$ optionally substituted alkyl, aryl or cycloalkyl aliphatic group, 1,2-ethylene, 1,2-ethylidene, 4-carboxyl -1,2-phenylene, 1,3-propylene, 1,2-cyclohexyl, 1,2-phenylene, 1,3-phenylene, 1,4-phenylene, and 1,2-cyclohex-4-enyl.

5. The process according to claim 1, wherein the cyclic anhydride is selected from the group consisting of phthalic anhydride, tetrahydro phthalic anhydride, hexahydro phthalic anhydride, 5-norbornane-2, 3-dicarboxylic anhydride, norbornane-2,3-dicarboxylic anhydride, 2-dodecene-1-yl-succinic anhydride, (methyl)-succinic anhydride, glutaric anhydride, 4-methylphthalic anhydride, 4-methylhexahydro phthalic anhydride, trimellitic anhydride, pyromellitic dianhydride and 4-methyltetrahydro phthalic anhydride, and mixtures thereof.

6. The process according to claim 1, wherein the cyclic anhydride is obtained by a reaction of maleic anhydride with an alkene.

7. The process according to claim 1, wherein the cyclic anhydride is provided with a carboxylic acid group.

8. The process according to claim 1, wherein the alkanol amine has the following general formula III:

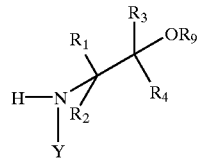

(III)

wherein $R_1$, $R_2$, $R_3$ and $R_4$ are groups selected from the group consisting of H, a ($C_1$–$C_8$) aryl group, a ($C_1$–$C_8$) (cyclo)alkyl group and $CH_2$—OR, in which R is selected from the group consisting of H, aryl and (cyclo)alkyl, $R_9$ is selected from the group consisting of

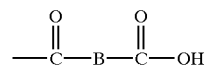

a salt thereof and H and Y is selected from the group consisting of

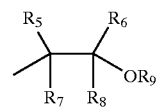

alkyl aryl group, wherein $R_5$, $R_6$, $R_7$ and $R_8$ are selected from the group consisting of ($C_1$–$C_8$)aryl, ($C_1$–$C_8$) (cyclo)alkyl and $CH_2$—OR, in which R is selected from the group consisting of H, aryl radical and (cyclo)alkyl, and $R_9$ is selected from the group consisting of

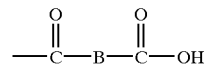

a salt thereof and H.

9. The process according to claim 8, wherein the alkanol amine is selected from the group consisting of:
monoalkanol amines, dialkanol amines, trialkanol amines and mixtures thereof.

10. The process according to claim 1, wherein the process is carried out in the presence of a solvent.

11. The process according to claim 1, wherein the molar ratio of the anhydride:amine is below about 2:1.

12. The process according to claim 1, wherein the anhydride and amine are mixed together, substantially in the absence of a polymer.

13. A resin for binding mineral fibres prepared according to the method of claim 1.

14. A binder composition for binding mineral fibres, comprising a resin prepared according to claim 1 and a binder additive.

15. A binder for binding mineral fibres, said binder consisting essentially of:
the reaction products of a cyclic anhydride and an alkanolamine, wherein one or more of the resulting reaction products contain one or more carboxylic acid groups which provide a cross-linking function within the binder,
which reaction products of the cyclic anhydride and the alkanolamine exhibit water solubility.

16. The binder according to claim 15, wherein the alkanol amine is a secondary β-hydroxy alkylamine.

17. The binder according to claim 15, wherein the mixture of the anhydride and the amine is heated to a temperature lying in the range of 20° C. to 100° C.

18. The binder according to claim 15, wherein the cyclic anhydride has the following general formula (II),

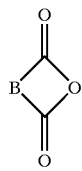
(II)

wherein B is a group selected from the group consisting of a $C_2$–$C_{20}$ optionally substituted alkyl, aryl or cycloalkyl aliphatic group, 1,2-ethylene, 1,2-ethylidene, 4-carboxyl-1,2-phenylene, 1,3-propylene, 1,2-cyclohexyl, 1,2-phenylene, 1,3-phenylene, 1,4-phenylene, and 1,2-cyclohex-4-enyl.

19. The binder according to claim 15, wherein the cyclic anhydride is selected from the group consisting of phthalic anhydride, tetrahydro phthalic anhydride, hexahydro phthalic anhydride, 5-norbornane-2, 3-dicarboxylic anhydride, norbornane-2, 3-dicarboxylic anhydride, 2-dodecene-1-yl-succinic anhydride, (methyl)-succinic anhydride, glutaric anhydride, 4-methylphthalic anhydride, 4-methylhexahydro phthalic anhydride, trimellitic anhydride, pyromellitic dianhydride and 4-methyltetrahydro phthalic anhydride, and mixtures thereof.

20. The binder according to claim 15, wherein the cyclic anhydride is provided with a carboxylic acid group.

21. The binder according to claim 15, wherein the alkanol amine has the following general formula III:

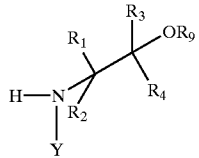
(III)

wherein $R_1$, $R_2$, $R_3$ and $R_4$ are selected from the group consisting of H, a ($C_1$–$C_8$) aryl group, a ($C_1$–$C_8$) (cyclo)alkyl group and $CH_2$—OR, in which R is selected from the group consisting of H, an aryl group and a (cyclo)alkyl group, $R_9$ is selected from the group consisting of

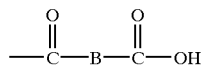

a salt thereof and H and
Y is selected from the group consisting of

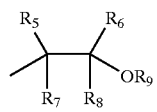

an alkyl group and an aryl group wherein $R_5$, $R_6$, $R_7$ and $R_8$ are selected from the group consisting of a ($C_1$–$C_8$) aryl group, a ($C_1$–$C_8$) (cyclo)alkyl group and $CH_2$—OR, in which R is selected from the group consisting of H, an aryl group and a (cyclo)alkyl group, and $R_9$ is selected from the group consisting of

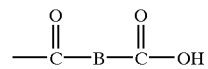

a salt thereof and H.

22. The binder according to claim 21, wherein the alkanol amine is selected from the group consisting of monoalkanol amines, dialkanol amines, trialkanol amines and mixtures thereof.

23. The binder according to claim 15, wherein the anhydride and amine have been reacted together in the presence of a solvent.

24. The binder according to claim 15, wherein the molar ratio of the anhydride:amine is below about 2:1.

25. The binder according to claim 15, further comprising a binder additive selected from the group consisting of hydrophobicity agents, fluorocarbon compounds; hydrophilic surfactants; silanes; titanates; hydroxides and an accelerator.

26. A process for providing a bound mineral fibre product, comprising the steps of:
   administering a binder according to claim 13 to the mineral fibres, and curing the binder.

27. A mineral fibre product produced by the process of claim 26.

28. A thermosettable resin for binding mineral fibres according to claim 13, said resin comprising:
   a substantially polymer-free compound, having at least one of a carboxylic acid group and a β-hydroxyalkyl amide group.

29. The resin of claim 28, in which the compound comprises at least one carboxylic acid group and at least one β-hydroxyalkyl amide group and wherein the ratio of the carboxylic acid groups to the β-hydroxyalkyl amide groups lies between 1.0:5.0, and 5.0:1.0.

30. The resin according to claim 29, wherein the ratio of the carboxylic acid groups and the β-hydroxyalkyl groups lies between 1.0:3.0 and 2.0:1.0.

31. The resin according to claim 28, wherein the functionality of the hydroxyalkyl groups lies in the range 1–250.

32. The resin according to claim 28, wherein said compound has the following general formula (I):

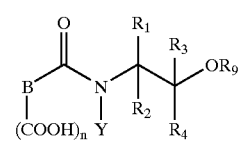
(I)

wherein
n=1, 2, 3
B is selected from the group consisting of a ($C_2$–$C_{20}$) optionally substituted alkyl, aryl or cycloalkyl aliphatic group, 1,2-ethylene, 1,2-ethylidene, 4-carboxyl-1,2-phenylene, 1,3-propylene, 1,2-cyclohexyl, 1,2-phenylene, 1,3-phenylene, 1,4-phenylene and 1,2-cyclohex-4-enyl radical,
$R_1$, $R_2$, $R_3$, $R_4$, $R_5$, $R_6$, $R_7$ and $R_8$ are selected from the group consisting of H, a ($C_1$–$C_8$) aryl group, a (cyclo)alkyl group and $CH_2$—OH, in which R is selected from the group consisting of H, an aryl group and a (cyclo) alkyl radical group, $R_9$ is selected from the group consisting of

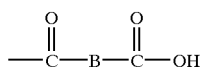

a salt thereof and H and

Y is selected from the group consisting of

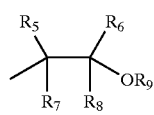

an alkyl group and an aryl group.

33. The resin according to claim 28, wherein said compound has a molecular weight of less than about 1000.

34. The resin according to claim 28, wherein said compound is water soluble.

35. A binder composition suitable for mineral fibres, said binder comprising:

a resin according to claim 28, and, standard binder additives.

36. The binder composition according to claim 35, further comprising an accelerator.

37. The resin according to claim 28, wherein the compound is selected from the group consisting of the following compounds A-I, wherein B is selected from the group consisting of a ($C_2$–$C_{20}$) optionally substituted alkyl, aryl or cycloalkyl aliphatic group, 1,2-ethylene, 1,2-ethylidene, 4-carboxyl-1,2-phenylene, 1,3-propylene, 1,2-cyclohexyl, 1,2-phenylene, 1,3-phenylene, 1,4-phenylene and 1,2-cyclohex-4-enyl radical:

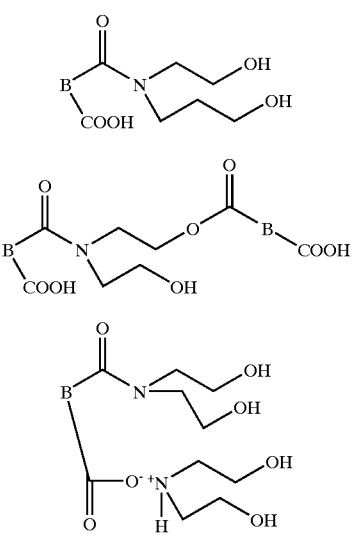

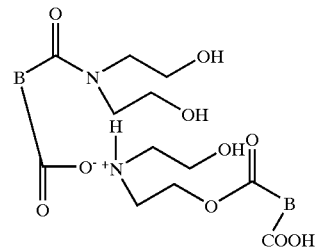

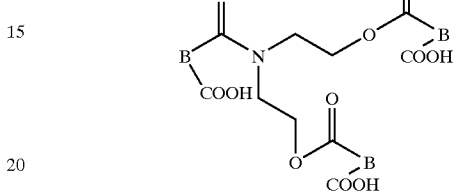

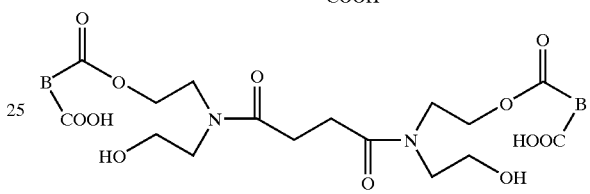

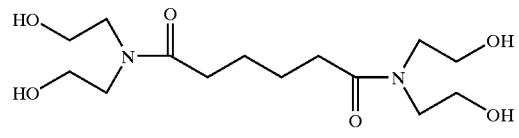

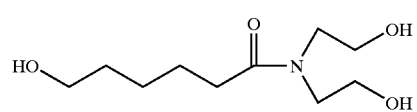

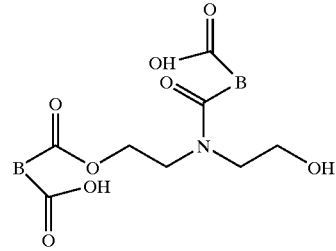

38. The binder composition according to claim 35, further comprising water.

39. The binder composition according to claim 35, having a dry binding strength of at least 3 N/mm$^2$, and having a wet binding strength of at least 1 N/mm$^2$, after 3 hours in water having a temperature of 80° C.

40. A mineral fibre product comprising the resin of claim 13.

41. A process according to claim 26, comprising the step of spraying mineral fibres with the binder and subsequently curing the mineral fibres at temperatures between 150 and 300° C.

42. A mineral wool product covered with a binder according to claim 15, which binder has been cured.

43. The process of claim 1, further comprising reacting the reaction products with a volatile base.

44. The resin of claim 13, wherein the reaction products are reacted with a volatile base.

* * * * *